July 22, 1958  H. ARNOLD  2,844,423
FLANGE TYPE PISTON RING
Filed Jan. 22, 1957
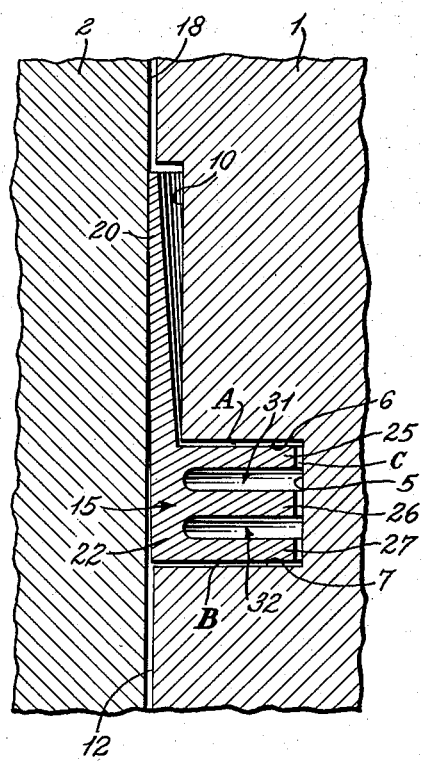
INVENTOR
Hartmut Arnold
BY Thomas, Weisman & Russell
ATTORNEYS

United States Patent Office 2,844,423
Patented July 22, 1958

2,844,423

FLANGE TYPE PISTON RING

Hartmut Arnold, Burscheid, near Koln, Germany, assignor, by mesne assignments, to Rand Goetze Corporation, Cleveland, Ohio, a corporation of Ohio Application January 22, 1957, Serial No. 635,483

Claims priority, application Germany February 22, 1956

4 Claims. (Cl. 309—44)

This invention relates to a piston ring for internal combustion engines and, in more particular, to a piston ring of the so-called flange type. In brief, the invention is pertinent to a piston ring wherein the cross-sectional shape thereof approximates that of an L, the ring comprising a relatively long, flexible, cylinder contacting flange, used in conjunction with a lower portion of considerably greater radial width. In the instant invention, and as will be described, the special formation of the lower portion of the flange ring acts to increase the sealing propensities of the ring and further inhibits the deleterious functions which might otherwise occur and which are resultant upon so-called ring flutter and consequent wasteful by-passing of the combustible fuel.

As is well-known, the most common form of piston ring and the type which is in more general usage today is one of more or less rectangular cross-sectional configuration. This type of ring is loosely positioned within a suitable ring groove and the force it exerts against the wall of the piston is due to an inherent spring loading of the ring, the same being manufactured of such material and in such a way that it inherently tends to expand outwardly, thereby bearing against the wall of the piston in sealing fashion. Necessarily being located in ring grooves of substantially larger dimension than the cross-sectional area of the ring itself (to facilitate mounting upon the piston and for other reasons), such rings, generally alternatively classified as expansion rings, are subject to what is termed ring flutter or movement of the ring up and down as well as laterally within the ring groove. Such ring flutter necessarily induces blow-by, for the substantially larger dimension of the groove permits gases under compression, during such periods of fluttering, to escape or by-pass through the large tolerances existing in the ring groove and around the top and bottom sides, and back, of the piston ring itself.

In the main, such expansion rings are capable of exerting only that thrust or sealing contact against the wall of the piston as is consequent upon the amount of spring loading which has been incorporated in the material out of which the ring is fabricated. No matter at what speed the engine is run, nor under what load it might be subjected, the outward thrust of such rings and their consequent amount of sealing efficiency remains the same and is not substantially aided by any of the forces of compression or expansion which may periodically exist during reciprocation of the piston during various cycles of engine operation.

Rings, L-shaped in configuration (i. e., L-shaped with respect to their cross-sectional areas), are also known to the art. For various reasons, these too exhibit numerous disadvantages, probably more so than the ordinary type of expansion ring referred to above, and for that reason have not come into general commercial usage. The primary reason for such unsatisfactory operation of such known flange type of rings is the fact that the portion of the ring contacting the cylinder wall is, generally speaking, of the same cross-sectional dimension as that portion fitted within the ring groove. Relatively speaking, this contacting portion is thus considerable in size, or at least substantially so to substantially inhibit, if not completely prohibit, any amount of movement outwardly or movement in a direction to effectively add to the sealing function. In the prior art, such L-shaped rings have been designed, not primarily to take advantage of the flexible action of the contacting portion, but merely to present a greater surface of contact with the cylinder wall and, hence, designs of this type furnish examples embodying an underlying concept which is completely different from the novel concept of the instant invention.

This invention is based primarily upon the basic concept involved in providing an L-shaped type of piston ring with a thin up-standing flexible flange that is made with a lower portion of substantial radial dimension, and includes the contributing factor of providing such base portion with a means, in the form of gas pressure receiving pockets which contribute substantially to the sealing function of the flange. These also advantageously inhibit or substantially prevent blow-by or any passage of gases under pressure around the sides and back of the ring when fitted in its complementary ring groove.

Thus, according to this invention, the lower base portion supporting the flexible part of the ring (which might be termed the carrier part for the flange) is provided with a labyrinth-like chamber or series of chambers in which gases under pressure are collected. The involved pressures tend to seal the spaces between ring and ring groove and, as well, force the ring into tighter sealing contact with the cylinder wall. These chambers, extending interiorly into the carrier part, are preferably circular in configuration at their inner, terminating end portions, primarily because the rigidity of the carrier part is not then impaired and also because manufacturing of the ring is thus simplified. The involved tolerances between the back and side walls of the ring groove and the top and bottom and interior periphery of the carrier part of the flange ring are reasonably small in order that any gases under pressure are substantially blocked from relatively rapid passage about the sides of the ring contacting the ring groove. In fact, such combution gases stream only vary slowly through this so-called labyrinth and, being under pressure, not only tend to force the ring outwardly in sealing contact with the cylinder wall but also substantially resist by-passing of the ring, in the sense in which it is generally understood.

In the case of fast running engines, it will be a practical impossibility for such gases under pressure to pass through or behind the back side of the ring, for constant and continual changes in pressure generally permit only the first chamber to be filled with the same. Furthermore, the piston ring of this invention sits relatively fixedly in its groove and this effect is further facilitated by this factor: the gases which enter behind the ring and into the several chambers in the lower portion or carrier part of the ring tend to press the opposed, confining flanges, or those flanges bounding these chambers, apart from each other, thereby obtaining good axial sealing between ring and ring groove at these points. By "flanges" is here meant the elements to be referred to, bounding the several gas collecting chambers.

It is, accordingly, a primary object of this invention to provide a unitary and integral L-shaped piston ring having a flexible piston contacting flange that is forced into sealing relationship with the cylinder wall, not only by gases under pressure immediately behind such flange portion, but also by gases which collect, under pressure, in the several chambers of the base portion of the ring.

It is a further object of the invention to provide a ring of the described nature wherein a labyrinth or series of gas collecting chambers is provided in the base or carrier portion thereof, such base portion being fitted with relatively small tolerances within the ring groove and thus presenting a tortuous passageway for any contacting gases under pressure, such circuitous formation inhibiting passage of same behind the ring and affording a block or seal preventing blow-by and substantially inhibiting ring flutter.

It is another object of the invention to provide a piston ring of the described type wherein sealing of the ring against the cylinder wall is not simply dependent upon any spring loading of such ring or employment of complementary expansion rings, but is primarily aided by the effective force of gases under pressure behind the flange part of the ring; in this sense, the flange part tends to seal at those instants in the cycle of operation where the greatest sealing effect is desired, i. e., when the engine is under high load conditions and the pressure of such gases reaches its peak. Stated in another way, the engine herein provides for effective and tighter sealing at the moments when closure and tighter contact with the cylinder wall is necessary, as when the engine is operating under higher load conditions.

Another object of the invention is secondary to that just above mentioned: the provision of piston ring of such design that under conditions of light load, the pressure of contact of the flange part of the ring is much less than the pressure applied when under high load. The result of this effect is to substantially reduce wear upon the ring, because at either low or high idle speeds, for example, the flange is not thrust outwardly by gas pressure, but only lightly contacts the cylinder wall to effectuate such sealing as is necessary under these conditions. Much the same effect follows with respect to wear, even under load conditions, for on periodic non-working strokes of the piston, the flange portion of the ring will contact the cylinder wall with comparatively light pressure; whereas, during working strokes of the engine when the involved gas pressures are considerably higher, a tighter seal, due to the forcing outwardly of the flexible lip or flange, is effectuated.

The above and other objects and advantages of the invention will appear more fully from the following more detailed description.

In the drawing, the single figure is a view, partly in section, showing a greatly enlarged and somewhat schematic representation of the piston ring of the present invention. It is to be understood that the drawing is representative only of the preferred thinking as to the form and shape of the ring of my invention and its operation, and the claims hereof are not to be construed as being confined to the relative dimensions which appear in this drawing, so long as the essential elements thereof are preserved in substance.

In this drawing, the ring is shown applied to a largely conventional type of piston 1 which is fitted within the usual form of bore or cylinder 2 in an obvious manner. As is usual, the piston periphery 12 is of a diameter somewhat less than the diameter of the cylinder wall 18. This piston is provided with a ring groove, here shown as substantially rectangular in cross section, the same being adapted to receive the lower portion or carrier part of the contacting flange part of the ring.

In order to clarify the following expanation, this ring groove is more particularly designated as one having a back wall or inner periphery 5, as well as the two opposed upper and lower walls 6 and 7, respectively. In this sense, the ring groove is of an ordinary type. It does vary in at least one respect in order that the flange part of the ring will be aptly accommodated and in order that combustion gases may pass behind such flange or in between the flange and the main body of the piston 1. To this end the piston is fabricated with a peripheral depression 10, i. e., the piston is reduced in size at the portion 10. This despression, longitudinally speaking, extends from the ring groove upwardly to a point substantially past the end of the flange portion of the ring and is of sufficient depth to accommodate this flange at its lower and thickest portion. Hence, it is seen that combustion gases progressing downwardly between piston and cylinder wall are permitted to fill the space in between the wall of the piston at the depression 10 and the inner side of the flexible flange, with the consequent effect of exerting thrust or force outwardly to cause such flexible flange to bear against the cylinder wall.

Although integrally made, this flange ring of the invention is thus a composite of two parts; the lower carrier part generally indicated at 15 and the upper extended, flexible lip or flange 20. The latter can be made of any durable material which is inherently flexible, at least considering the thicknesses involved in the fabrication of such flange. Those skilled in the art will appreciate that it is made of a metal and of a thinness, particularly at its upper extremity, which will be conductive to somewhat readily flex under the pressures encountered in normal engine operation.

As shown, the flange portion extends upwardly in a plane which is approximately normal to a radial plane extending through the carrier part of the ring. As indicated in the drawing, it appears that the upper portion of the flange ring, but not the lower, bears against the cylinder wall. This is intended to but diagrammatically illustrate the effect of pressure against the inner side of the flange and the result thereof of the flange in turn tightly sealing against the cylinder wall. Under the tolerances here considered, this effect is largely exaggerated in the drawing for, normally, flexing to obtain this sealing effect would only be of a comparatively minute order.

The lower main body portion of carrier portion 15 of the ring, seated within the ring groove, is provided with several flanges, such as indicated at 25, 26 and 27, and in this preferred embodiment, these three flanges necessarily bound two circular grooves formed in the inner periphery of the portion 15, such grooves being designated at 31 and 32. These grooves or chambers 31 and 32 form a labyrinth-like passageway for combustion gases under pressure.

As stated above, the tolerances involved in the fitting of this carrier part within the ring groove are of a relatively small order, in order that there is not an undue tendency of the ring to reciprocate or flutter within the groove. More specifically, and with respect to the embodiment herein disclosed, it has been found that the top and bottom clearances, here indicated at A and B, respectively, will be of the order of about ±.002". The back clearance C may be substantially greater or about ±.005". In any event, the small back clearance permits these combustion gases under pressure to stream, but only slowly, into the space C. In actual practice, it is a practical impossibility, in dealing with the clearances here involved, for such combustion gases to pass completely through behind the back side of the ring, since the constant change in pressure is conducive only to a sealing of the first chamber 31. Having in mind the top and bottom clearances stated above, it is seen that the piston ring sits relatively fixedly in its groove and, hence, any gas which enters into the chambers 31 or 32 increases the sealing effect by expanding the flanges 25 and 27 outwardly whereby a good axial seal is thus assured.

In functioning as a sealing ring, these combustion gases under pressure thus encounter, in their downward movement, the flexible lip 20, tending to force it outwardly into greater sealing contact. A minor proportion of the same is forced into the labyrinth located in the lower, base portion 22 of the ring and formed by the three flanges 25, 26 and 27. Initially, they are caught within the chamber 31 and some permitted to continue downwardly to chamber 32; in each instance, they have the effect, as stated, of expanding the top and bottom flanges outwardly for greater sealing effect.

Further comparative measurements will indicate the preferred form of the invention although it is to be appreciated that the involved dimensions may be varied somewhat, having in mind the type of metal that is used and the type of engine to be fitted with flange rings of this description. At any rate the thickness of the flange part of the ring at its upper extremity will approximate between from about .010" to about .015". From top to bottom or considering the entire contacting face of the flange of the piston ring, the preferred length thereof is from about .250" to about .300", this length depending somewhat upon the diameter of the piston. The ring groove of the piston 1 may approximate .023" and the overall width (radially speaking) of the lower portion or carrier part of the flange ring will approximate .055".

As stated, such dimensions may be varied within practical limitations; it is important, however, that the flange ring of whatever dimension be sufficiently thin throughout its vertical length, and particularly at its upper portion thereof, as to exhibit sufficient flexibility for the purposes herein described.

The ring of the instant invention obviates the many disadvantages and, practically speaking, inoperative features of L-shaped rings designed in the past. This is primarily because of two reasons: firstly, it is designed for a flexible sealing operation and, secondly, means are provided for preventing flutter or by-passing of combustion gases. This latter factor is found in the several chambers or labyrinth existing on the inside of the carrier part of the ring.

While a preferred embodiment of the invention has been shown, it is to be understood that various modifications thereof may be resorted to without departing from the spirit and scope of the appended claims.

What is claimed:

1. In a one-piece flange ring adapted to be mounted in the piston of an internal combustion engine, a carrier portion, an upstanding portion extending upwardly approximately normal to a radial plane through said carrier portion, said upstanding portion tapering to a flexible, cylinder wall contacting member, said member being sufficiently flexible to be responsive to gaseous pressures, a ring groove in said piston, said carrier portion being adapted to be mounted in said ring groove, said carrier portion being provided with multiple, lateral chambers, said chambers being bounded by interiorly extending flanges, whereby combustion gases under pressure flex said member outwardly in sealing relationship with the cylinder of said engine, and said chambers prevent by-passing of said gases between said ring and said ring groove.

2. In a one-piece flange ring adapted to be mounted in the piston of an internal combustion engine, a carrier portion approximately rectangular in cross-sectional configuration, an upstanding portion extending upwardly approximately normal to a radial plane passing through said carrier portion, said upstanding portion tapering to a circular, flexible, cylinder wall contacting member, said member being sufficiently flexible to be responsive to gaseous pressures, a ring groove in said piston adapted to receive said carrier portion, said carrier portion being provided with multiple, lateral chambers, said chambers being bounded by interiorly extending flanges whereby combustion gases under pressure flex said member outwardly in sealing relationship with the cylinder of said engine, and said chambers prevent by-passing of said combustion gases between said ring and said ring groove.

3. In a one-piece flange ring adapted to be mounted in the piston of an internal combustion engine, a carrier portion, an upstanding portion extending upwardly approximately normal to a radial plane through said carrier portion, said upstanding portion tapering to a flexible, cylinder wall contacting member, said member being sufficiently flexible to be responsive to gaseous pressures, a ring groove in said piston, a flange receiving groove in said piston, said carrier portion being adapted to be mounted in said ring groove, said flange receiving groove being adapted to receive, in spaced relationship, said upstanding portion, said carrier portion being provided with multiple, lateral chambers, said chambers being bounded by interiorly extending flanges, whereby combustion gases under pressure between said member and said flange receiving member flex said member outwardly in sealing relationship with the cylinder wall of said engine, and said chambers prevent by-passing of combustion gases under pressure between said carrier portion and said ring groove.

4. In a one-piece, integral flange ring adapted to be mounted in the piston of an internal combustion engine, a carrier portion approximately rectangular in cross-sectional configuration, an upstanding portion extending upwardly approximately normal to a radial plane passing through said carrier portion, said upstanding portion tapering to a circular, flexible, cylinder wall contacting member, said member being sufficiently flexible to be responsive to gaseous pressures, a ring groove in said piston adapted to receive said carrier portion, a flange receiving groove in said piston, said flange receiving groove adapted to receive, in spaced relationship, said wall contacting member, said carrier portion being provided with multiple, lateral chambers opening radially towards the center axis of said piston, said chambers being bounded by interiorly extending flanges whereby combustion gases under pressure flex said member outwardly in sealing relationship with the cylinder of said engine, the outer of said flanges being forced apart axially, thereby preventing by-passing of said combustion gases between said ring and said ring groove.

References Cited in the file of this patent

UNITED STATES PATENTS

| 1,930,654 | Muchnic | Oct. 17, 1933 |
| 2,281,780 | Mercier | May 5, 1942 |
| 2,566,603 | Dykes | Sept. 4, 1951 |

FOREIGN PATENTS

| 739,616 | France | Jan. 14, 1933 |
| 907,416 | France | June 25, 1945 |